US012088745B2

United States Patent
Song et al.

(10) Patent No.: US 12,088,745 B2
(45) Date of Patent: Sep. 10, 2024

(54) COVER GLASS, METHOD FOR MANUFACTURING COVER GLASS AND MOBILE TERMINAL

(71) Applicant: LG ELECTRONICS INC., Seoul (KR)

(72) Inventors: Insu Song, Seoul (KR); Minsoo Kim, Seoul (KR); Sunggab Kim, Seoul (KR); Seungyeop Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 17/316,459

(22) Filed: May 10, 2021

(65) Prior Publication Data
US 2022/0131961 A1 Apr. 28, 2022

(30) Foreign Application Priority Data
Oct. 22, 2020 (WO) ................ PCT/KR2020/014529

(51) Int. Cl.
*H04M 1/02* (2006.01)

(52) U.S. Cl.
CPC ....... *H04M 1/0249* (2013.01); *H04M 1/0237* (2013.01)

(58) Field of Classification Search
CPC . H04M 1/0249; H04M 1/0237; H04M 1/0268
See application file for complete search history.

(56) References Cited

U.S. PATENT DOCUMENTS

| 5,640,066 A * | 6/1997 | Itou ...................... H01J 29/327 313/461 |
| 5,742,118 A * | 4/1998 | Endo ..................... H01J 29/896 106/287.34 |
| 6,076,933 A * | 6/2000 | DiLoreto ............. G02B 3/0068 359/452 |
| 7,345,680 B2 * | 3/2008 | David ..................... G06F 3/045 345/174 |
| 7,468,842 B2 * | 12/2008 | Steenblik ............... B42D 25/29 359/619 |
| 11,454,750 B1 * | 9/2022 | Blume ....................... C09J 7/38 |
| 2001/0050741 A1 * | 12/2001 | Hokazono ................ G02B 1/11 349/137 |
| 2007/0289768 A1 * | 12/2007 | Moore ................ G02F 1/13334 174/98 |

(Continued)

FOREIGN PATENT DOCUMENTS

| JP | 2001056461 | 2/2001 |
| KR | 1020130003829 | 1/2013 |

(Continued)

OTHER PUBLICATIONS

KR20130003829 English Translation (Year: 2013).*
PCT International Application No. PCT/KR2020/014529, International Search Report dated Jul. 19, 2021, 11 pages.

*Primary Examiner* — Jinsong Hu
*Assistant Examiner* — Rui M Hu
(74) *Attorney, Agent, or Firm* — LEE, HONG, DEGERMAN, KANG & WAIMEY

(57) ABSTRACT

A cover glass comprises a glass layer; and an inner film including a tint layer deposited on one surface of the glass layer, wherein the tint layer includes fine beads. The cover glass has good slip and excellent wear resistance.

13 Claims, 17 Drawing Sheets

(56) References Cited

U.S. PATENT DOCUMENTS

| | | | |
|---|---|---|---|
| 2008/0278076 A1* | 11/2008 | Hur | G02B 5/0226 445/24 |
| 2009/0059140 A1* | 3/2009 | Yanai | G02F 1/133512 349/110 |
| 2010/0021694 A1* | 1/2010 | Wakizaka | G02B 1/111 524/544 |
| 2013/0258467 A1* | 10/2013 | Shiraiwa | C09D 4/00 359/483.01 |
| 2013/0343063 A1* | 12/2013 | Park | H10K 59/871 362/311.1 |
| 2014/0036203 A1* | 2/2014 | Guillou | G02B 6/0003 349/187 |
| 2014/0078716 A1* | 3/2014 | Ninan | G02F 1/133617 977/774 |
| 2014/0293162 A1* | 10/2014 | Park | G06F 3/045 349/12 |
| 2016/0014529 A1* | 1/2016 | Hecht | H04R 1/023 381/388 |
| 2016/0143131 A1* | 5/2016 | Ahn | H05K 1/028 361/749 |
| 2016/0216410 A1* | 7/2016 | Asahi | G02B 1/14 |
| 2016/0327729 A1* | 11/2016 | Patterson | G06F 3/041 |
| 2016/0349497 A1* | 12/2016 | Ma | G02B 26/001 |
| 2016/0377770 A1* | 12/2016 | Kwon | G02B 5/003 359/599 |
| 2017/0139091 A1* | 5/2017 | De La Vega | G02B 5/0221 |
| 2017/0139442 A1* | 5/2017 | Yoshizumi | G04G 17/045 |
| 2017/0206830 A1* | 7/2017 | Lee | G02B 27/027 |
| 2017/0285246 A1* | 10/2017 | Teragawa | G02B 6/0055 |
| 2017/0293056 A1* | 10/2017 | Chen-Ho | G02B 5/128 |
| 2019/0302603 A1* | 10/2019 | Yanai | B32B 27/08 |
| 2020/0189226 A1* | 6/2020 | Clark | B32B 25/16 |
| 2020/0262743 A1* | 8/2020 | Kim | H05K 5/03 |
| 2020/0264660 A1* | 8/2020 | Song | G06F 1/1624 |
| 2020/0379283 A1* | 12/2020 | Diguet | G02F 1/13394 |
| 2021/0003882 A1* | 1/2021 | Lee | G02F 1/133607 |
| 2021/0018668 A1* | 1/2021 | Seo | G02B 5/3041 |
| 2021/0173123 A1* | 6/2021 | Watanabe | C09D 7/61 |
| 2021/0257582 A1* | 8/2021 | Kim | B32B 7/02 |
| 2021/0259102 A1* | 8/2021 | Shin | G06F 1/1686 |
| 2021/0286215 A1* | 9/2021 | Jang | G02F 1/133603 |
| 2021/0302646 A1* | 9/2021 | Park | G02B 6/0068 |
| 2021/0323269 A1* | 10/2021 | Lee | B32B 27/281 |
| 2021/0383731 A1* | 12/2021 | Watanabe | G09F 9/301 |
| 2021/0396917 A1* | 12/2021 | Wu | B33Y 80/00 |
| 2022/0024815 A1* | 1/2022 | Kim | G02B 1/11 |
| 2022/0149313 A1* | 5/2022 | Nakamura | H05B 33/02 |
| 2022/0219435 A1* | 7/2022 | Clark | B32B 27/08 |

FOREIGN PATENT DOCUMENTS

| | | |
|---|---|---|
| KR | 1020190054799 | 5/2019 |
| KR | 1020200072216 | 6/2020 |
| KR | 1020200099455 | 8/2020 |

* cited by examiner

FIG. 6
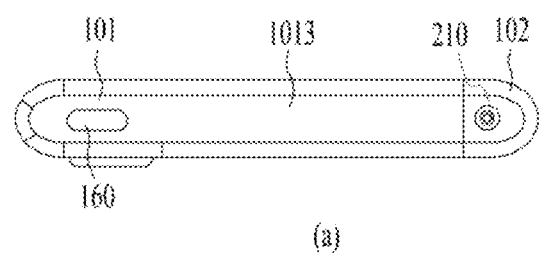
(a)
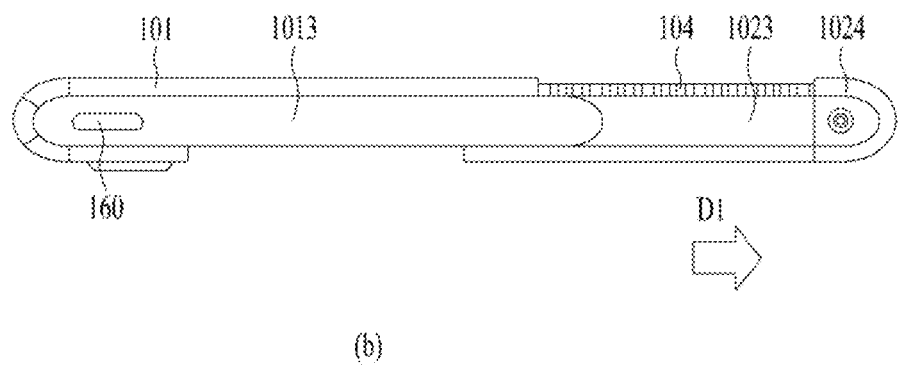
(b)

FIG. 7
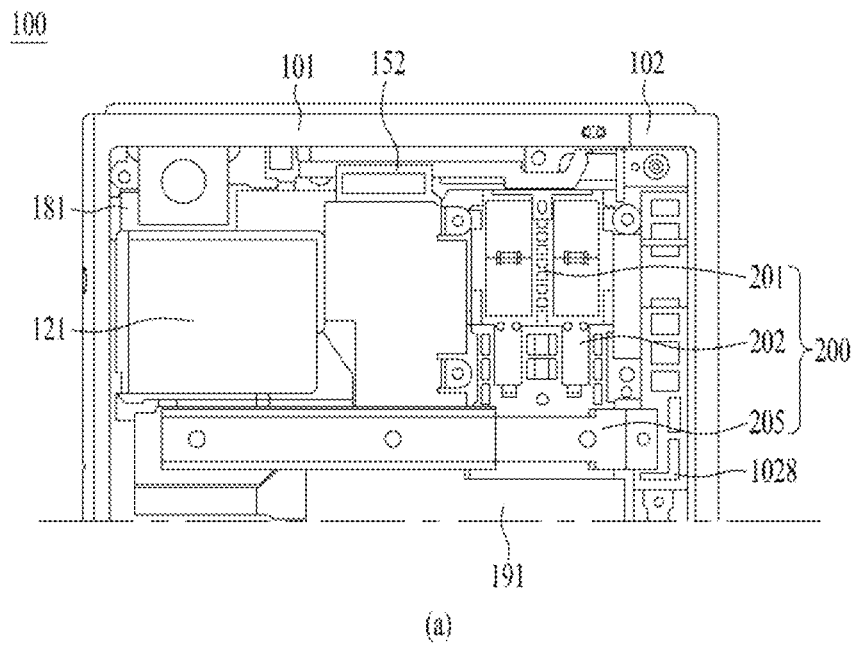
(a)
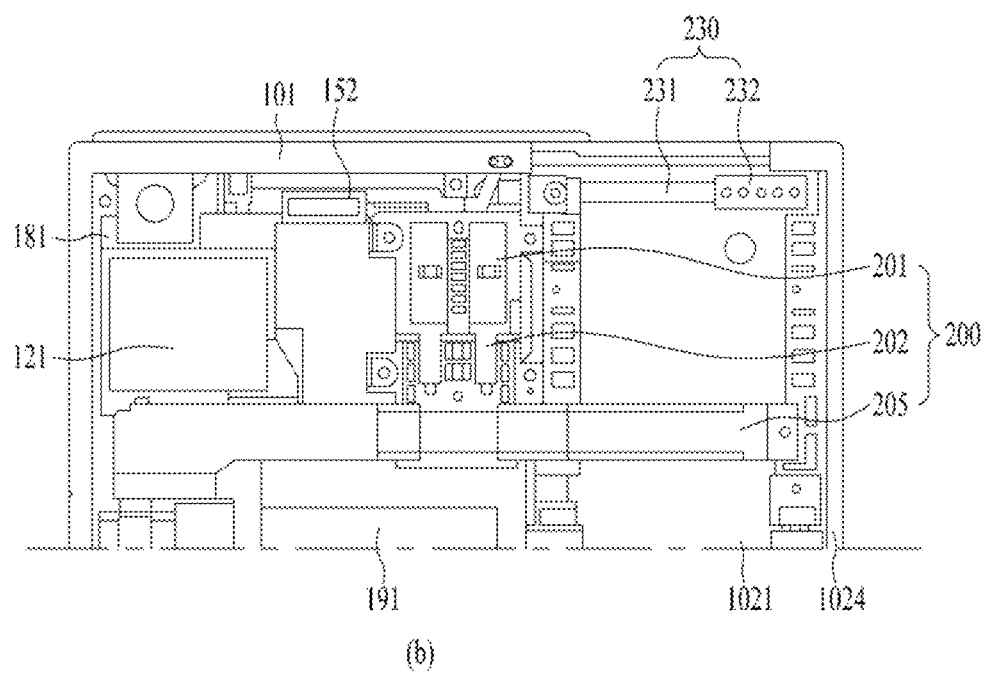
(b)

FIG. 8
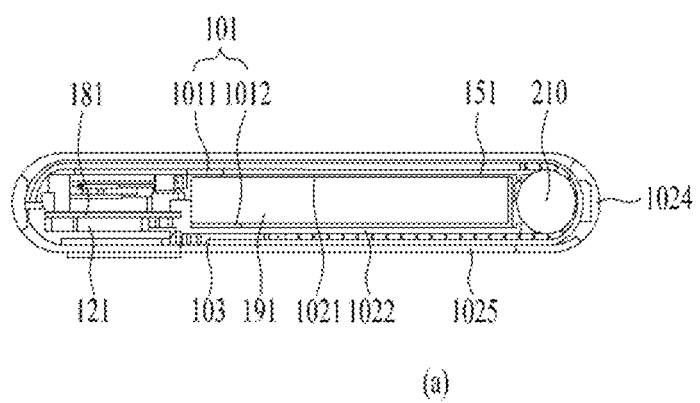
(a)
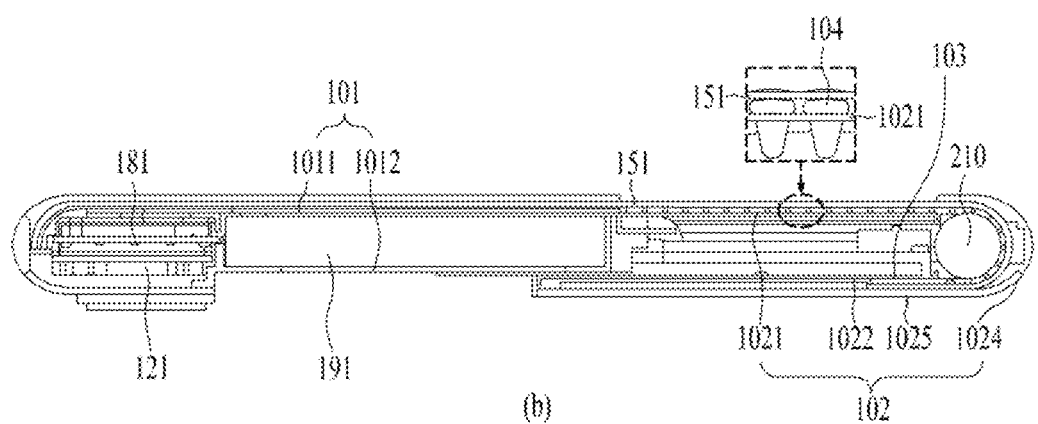
(b)

FIG. 11
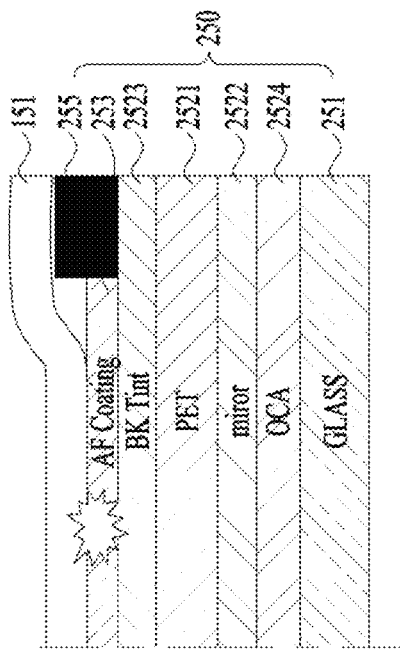
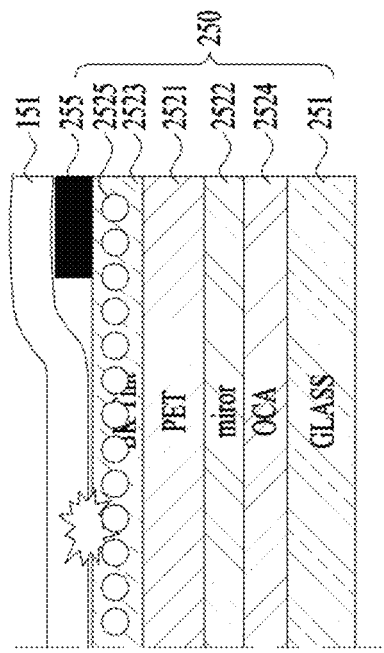
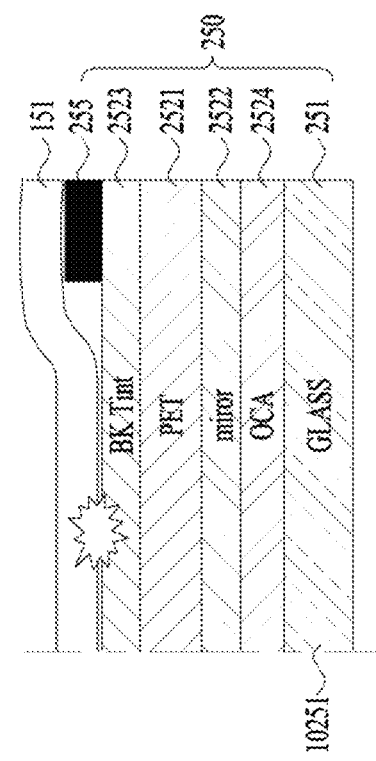
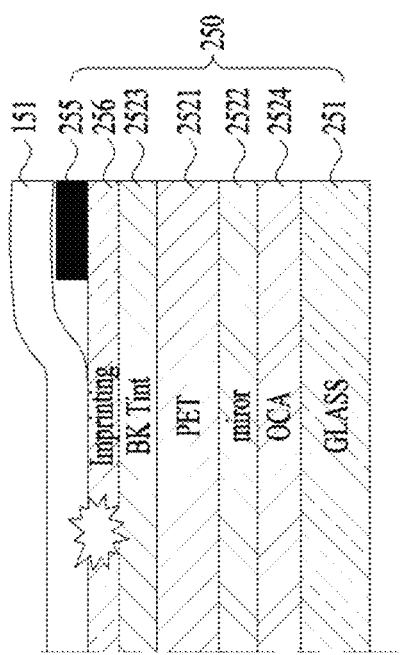

FIG. 12

| category | material type (bead size) | content | Haze(%) | frictional coefficient |
|---|---|---|---|---|
| related art | - | not included | 0.5 ↓ | not measurable |
| addition of fine beads | Acryl Bead (10μm) | 5% | 8.5~8.8 | 0.24 |
| | | 10% | 10~10.5 | 0.24 |
| | | 15% | 13.4~14 | 0.23 |
| | Silica (3μm) | 5% | 15 | 0.16~0.18 |
| | Silica (100~150nm) | 5% | 4.3~4.5 | 0.17~0.19 |
| | | ✓ 20% | 4.5~4.7 | 0.15~0.17 |

FIG. 13

| item | BK Tint + AF | BK Tint + Silica | BK Tint + Silica + AF |
|---|---|---|---|
| layered structure | | | |
| AG agent (silica) content | - | 20% | 20% |
| frictional coefficient (frictional material: UTF) | not measurable (occurrence of blocking) | 0.17~0.18 | 0.17~0.19 |
| Wear performance (with UTF) | Not measurable | 500g × 10k scratch | 500g × 40k No scratch |

FIG. 14
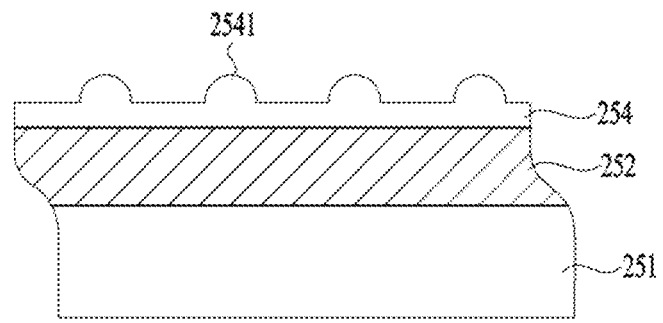
(a)
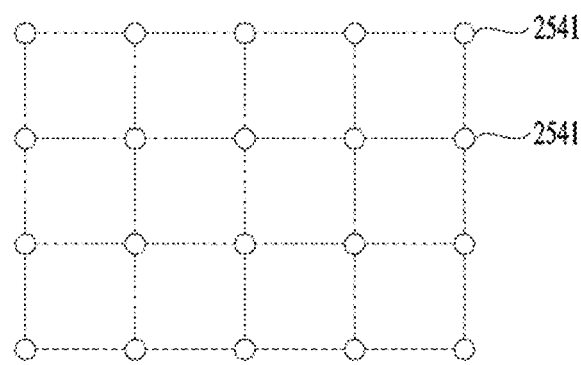
(a)
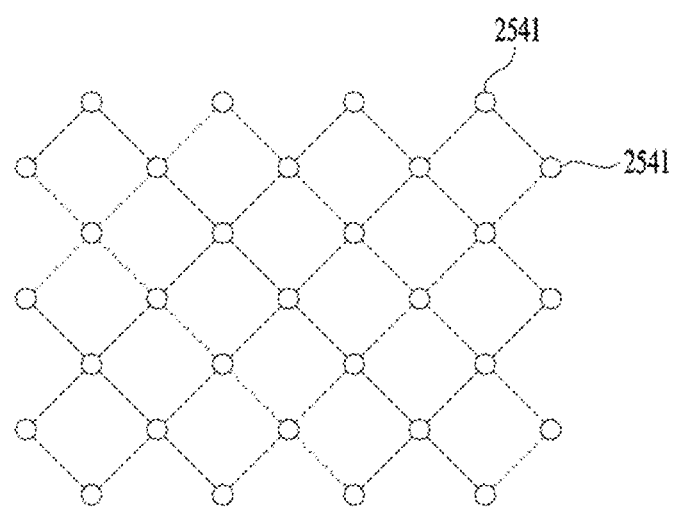
(a)

FIG. 15

| item | T-7 | T-8 | T-9 | T-10 | T-11 | T-12 | T-13 | T-14 |
|---|---|---|---|---|---|---|---|---|
| Dot Pattern | □ | □ | □ | □ | ◇ | ◇ | ◇ | ◇ |
| Dot diameter (μm) | 50 | 50 | 50 | 50 | 50 | 50 | 50 | 50 |
| Gap (μm) | 400 | 500 | 600 | 700 | 500 | 600 | 700 | 800 |
| hight (μm) | 5~7 | 5~7 | 5~7 | 5~7 | 5~7 | 5~7 | 5~7 | 5~7 |
| POLED Moire | NG | NG | OK | OK | NG | NG | NG | OK |
| Anti-Bloking | OK | OK | OK | OK | OK | OK | OK | OK |
| Haze | OK | OK | OK | OK | OK | OK | OK | OK |
| watermark | OK | OK | OK | OK | OK | OK | OK | OK |

FIG. 17
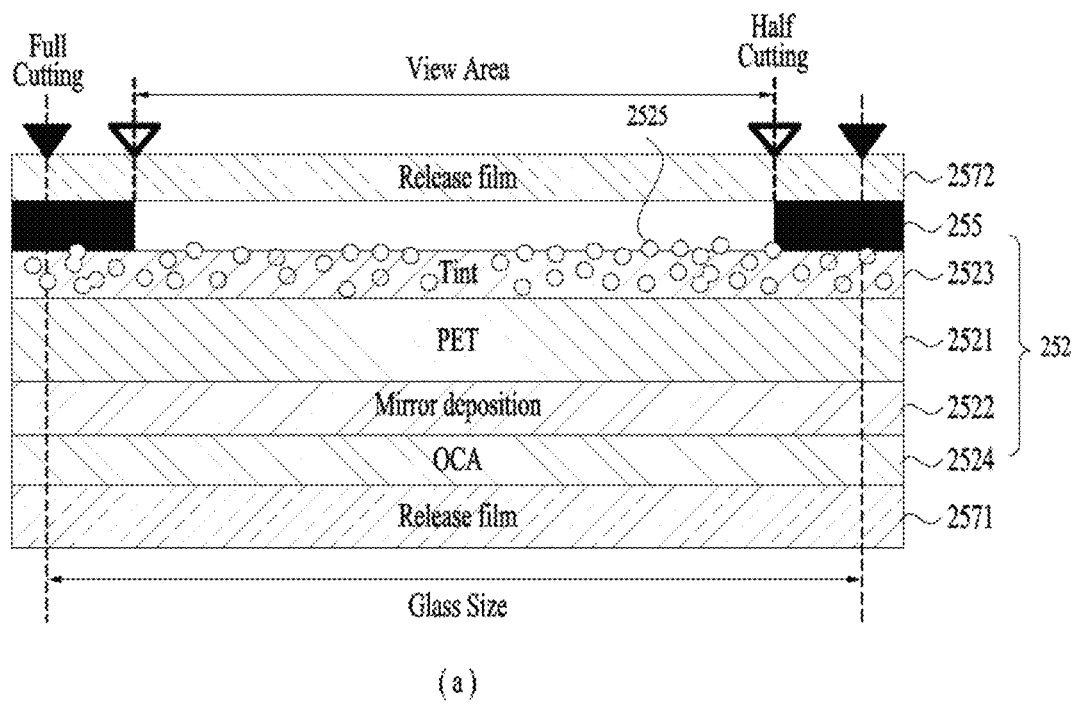
(a)
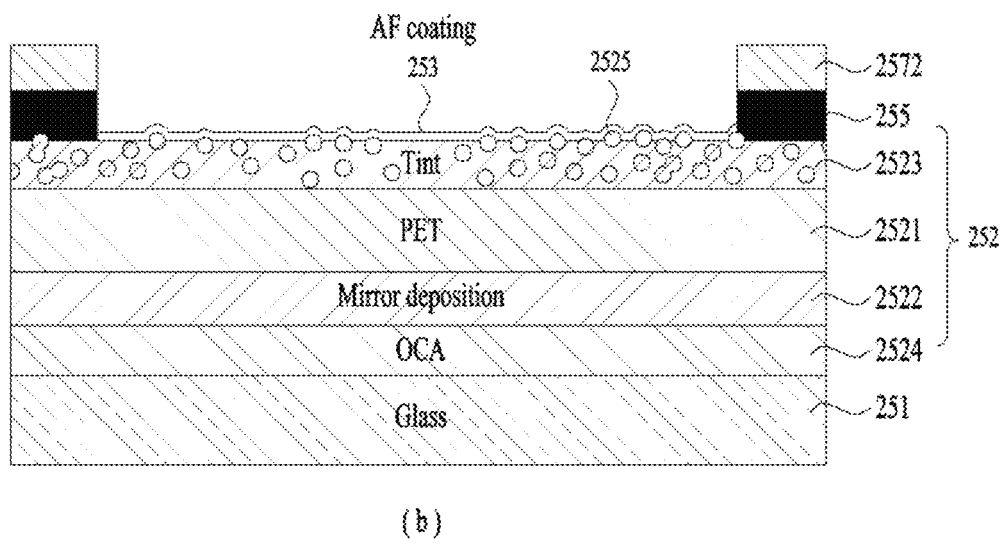
(b)

COVER GLASS, METHOD FOR MANUFACTURING COVER GLASS AND MOBILE TERMINAL

Pursuant to 35 U.S.C. § 119 (a), this application claims the benefit of an earlier filing date and right of priority to International Application No. PCT/KR2020/014529 filed on Oct. 22, 2020, the contents of which are hereby incorporated by reference herein in its entirety.

BACKGROUND OF THE INVENTION

Field of the Invention

The present disclosure relates to a cover glass having excellent slip and excellent wear resistance and a mobile terminal in which a display unit may smoothly perform a sliding motion.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

Recently, a flexible display having sufficient elasticity and capable of large deformation has been developed. The size of a mobile terminal can be varied using the deformable nature of the flexible display. For the mobile terminal having such a variable structure, changing the size of the mobile terminal should be stably performed, and there is a need for a structure to support the extended display unit to maintain a flat state of the display unit.

Also, since the variable flexible display may slidably move while being deformed, a problem occurs in that operation and durability are deteriorated due to a friction with a member adjacent thereto.

SUMMARY OF THE INVENTION

Accordingly, the present disclosure is directed to a cover glass, a method for manufacturing the cover glass and a mobile terminal, which substantially obviate one or more problems due to limitations and disadvantages of the related art.

An object of the present disclosure is to provide a cover glass to which a display unit is not adhered so as not to disturb a sliding motion of the display unit.

An object of the present disclosure is to provide a mobile terminal that minimizes resistance when a frame and a display unit move.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the invention, as embodied and broadly described herein, a cover glass comprises a glass layer; and an inner film including a tint layer deposited on one surface of the glass layer, wherein the tint layer includes fine beads.

The fine beads may include silica.

The fine beads may have a diameter of 100 nm to 150 nm.

The fine beads may have a content of 5% or more of the tint layer.

The cover glass may further comprise an anti-fingerprint coating layer formed on one surface of the tint layer.

The cover glass may further comprise a primer layer between the anti-fingerprint coating layer and the tint layer.

The cover glass may further comprise a black matrix formed on an outer circumference of the tint layer, wherein the anti-fingerprint coating layer may be formed in an area except the area where the black matrix is formed.

The inner film may include a transparent film layer provided with the tint layer formed on one surface.

The cover glass may further comprise a mirror layer formed on the other surface of the transparent film layer.

The inner film may be adhered to the glass layer by a transparent adhesive.

The cover glass may further comprise a pattern layer deposited on one surface of the tint layer, including micro-dots disposed in an array pattern to be spaced apart from one another at a predetermined interval.

The cover glass may have a rectangular shape with four sides, and the micro-dots may be disposed in a square pattern parallel with the sides of the cover glass or inclined at 45° on the sides of the cover glass.

An interval between the micro-dots may range from 800 μm to 1000 μm.

Each of the micro-dots may have a diameter of 25 μm or more.

The fine beads may include a content of 1% or less.

A mobile terminal comprises a body having a variable size; a display unit including a variable portion slidably moving in accordance with a size change of the body; and a cover glass partially covering the variable portion of the display unit, wherein the cover glass includes a glass layer; and an inner film including a tint layer deposited on one surface of the glass layer, wherein the tint layer includes fine beads.

The fine beads may include silica, and may have a diameter of 100 nm to 150 nm.

The mobile terminal may further comprise an anti-fingerprint coating layer formed on one surface of the tint layer.

The mobile terminal may further comprise a black matrix formed on an outer circumference of the tint layer, wherein the anti-fingerprint coating layer may be formed in an area except the area where the black matrix is formed.

A method for manufacturing a cover glass comprises depositing a tint layer including fine beads on one surface of a transparent film layer; printing a black matrix on one surface of the tint layer; forming a plurality of inner films by performing laser cutting based on the black matrix; and depositing the inner films on one surface of a glass layer.

The fine beads may include silica, and may have a diameter of 100 nm to 150 nm.

The method may further comprise performing anti-fingerprint coating on one surface of the inner film.

The method may further comprise depositing a release film covering the black matrix, and removing the release film of an area where the black matrix is not formed before the anti-fingerprint coating is performed.

The black matrix may be formed in a rectangular shape along an outer circumference of the inner film.

The method may further comprise forming a mirror layer having high reflectivity on the other surface of the transparent film layer.

The cover glass of the present disclosure has good slip and excellent wear resistance.

Since the mobile terminal of the present disclosure is not adhered to the display unit or the cover glass, a slide motion of the mobile terminal is not disturbed, whereby the mobile terminal of the present disclosure has excellent operation performance.

Also, since the cover glass has good wear resistance, the mobile terminal is not damaged by movement of the display unit, whereby durability may be improved.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 6 is a side view of the mobile terminal as viewed from a third direction;

FIG. 7 is a view showing a driving unit of the mobile terminal in accordance with an embodiment;

FIG. 8 is a cross-sectional view taken along lines A-A and B-B in FIG. 2;

FIG. 11 is a view showing an embodiment of a layered structure of a cover glass of the related art;

FIG. 12 is a table showing frictional coefficients and a haze effect based on type, size and content of fine beads;

FIG. 13 is a table showing frictional coefficients and wear performance based on anti-fingerprint coating and fine beads;

FIG. 14 is a view showing an inner film deposited with a pattern layer on which micro-dots are formed and patterns of micro-dots;

FIG. 15 is a table showing performance based on a pattern interval and direction of micro-dots;

FIG. 17 is a conceptual view showing a layered structure of a cover glass.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
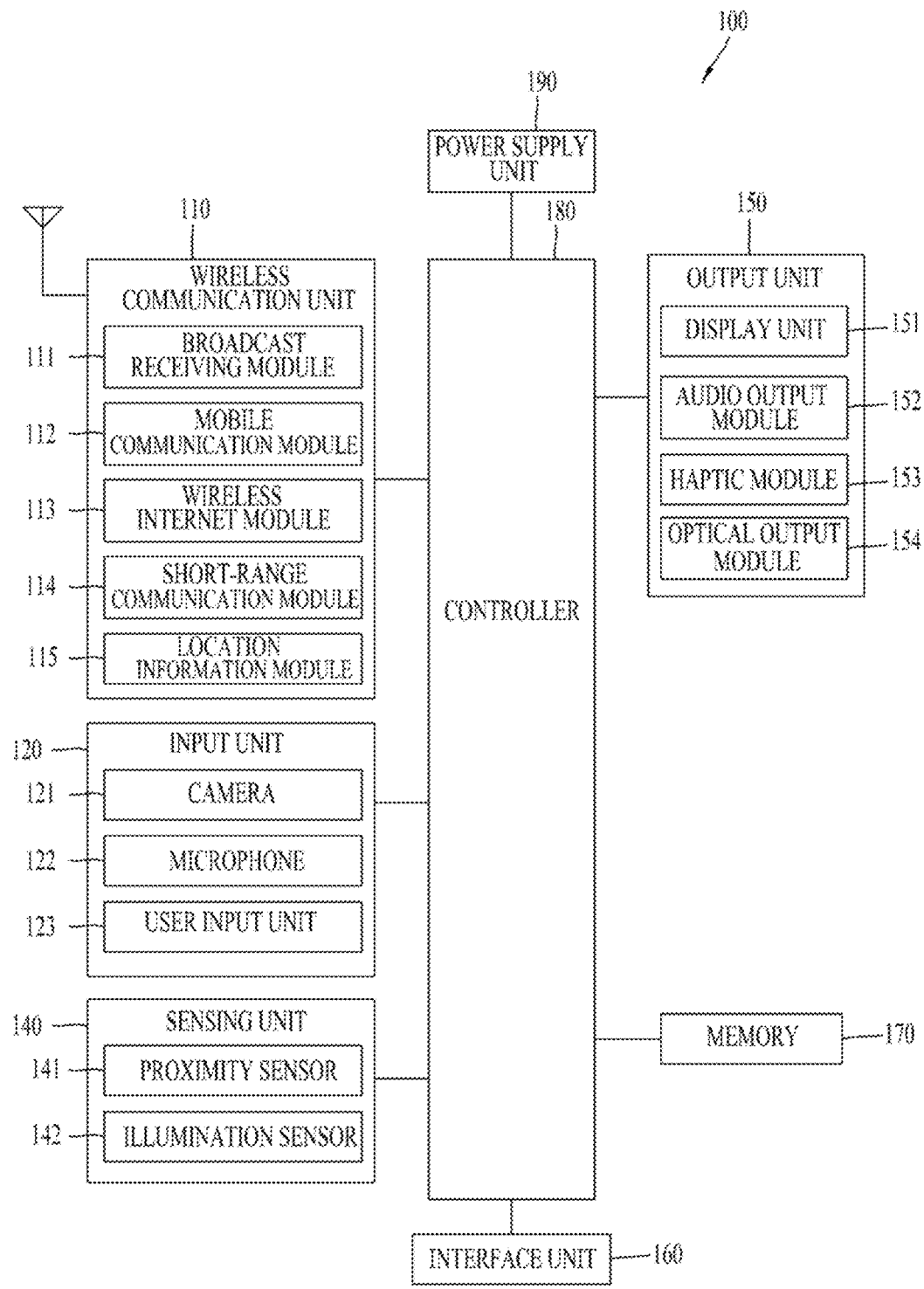
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example—the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
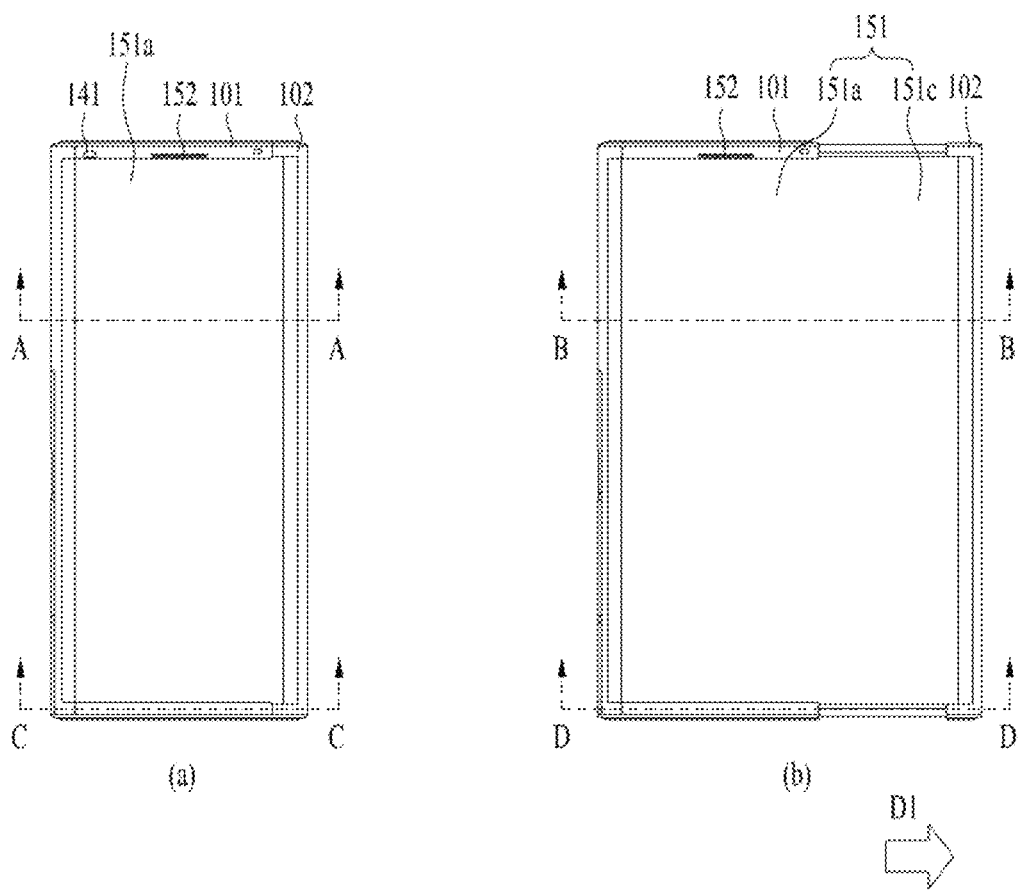
FIG. 2 is a front view of a first state and a second state of the mobile terminal in accordance with an embodiment.
Figure 3:
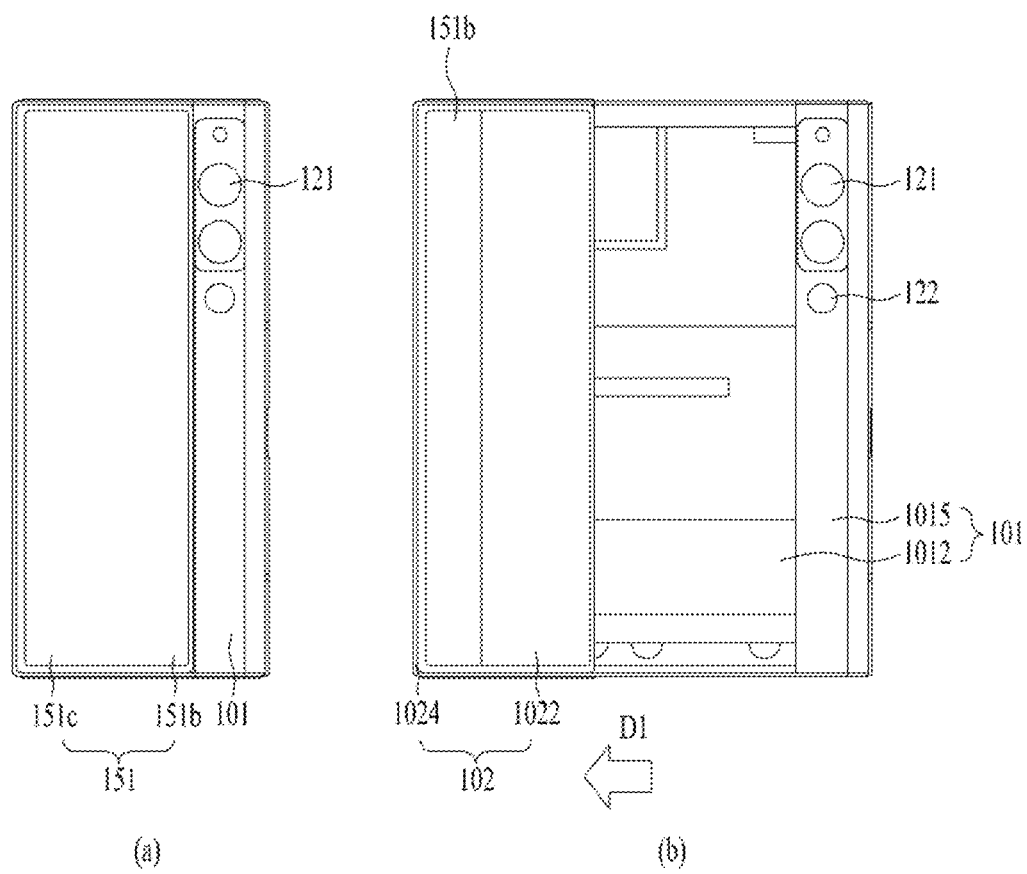
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third and fourth directions. Description will be made on the assumption that the first and second directions are horizontal directions and the third and fourth directions are vertical directions. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
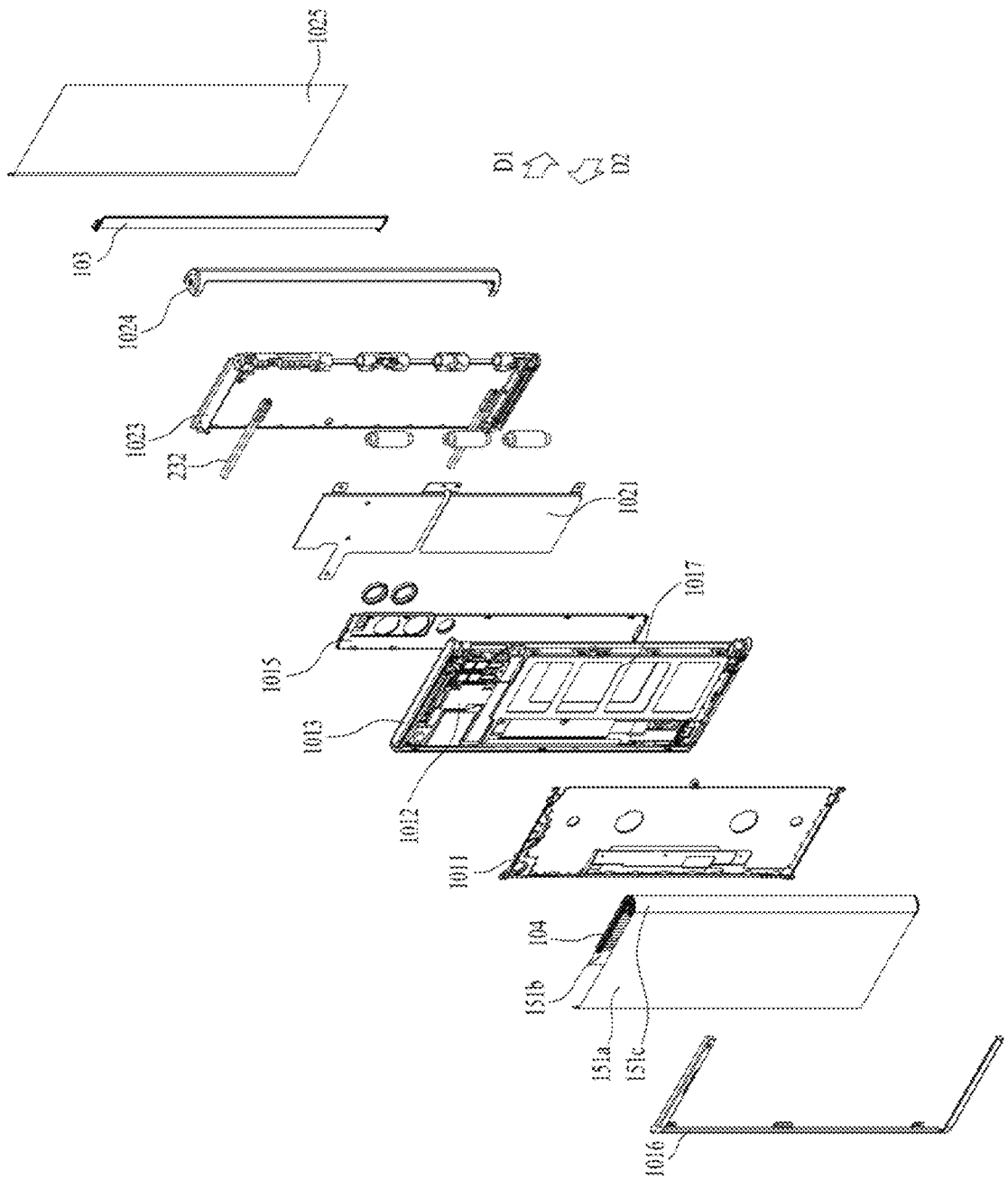
FIGS. 4 and 5 are exploded perspective views of the mobile terminal in accordance with an embodiment.
Figure 5:
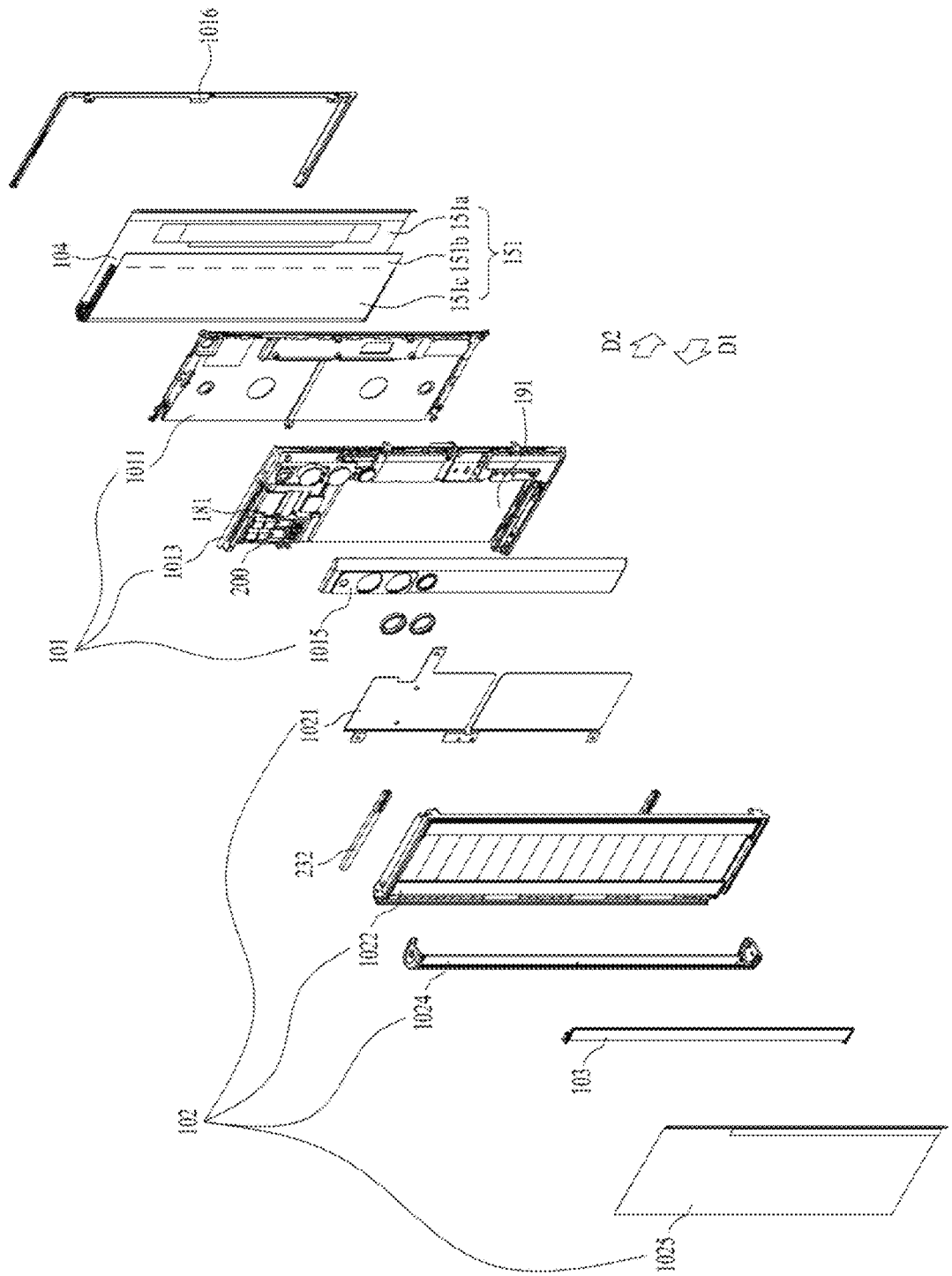

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted. A front deco 1016 may cover front edges of the first area 151a to protect the edges of the first area 151a.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151a and 151b and a variable portion 151c. The fixed portion 151a and 151b means a portion fixed to the frame. Because of being fixed to the frame, the fixed portion 151a and 151b maintains a constant shape without changing a bending degree. On the other hand, the variable portion 151c means a portion in which a bending angle or a position of the bent portion changes. The variable portion 151c in which the position or bending angle of the bent portion changes requires a structure for supporting a rear face of the variable portion 151c in response to the change.

The fixed portion 151a, 151b is coupled to the first frame of the display unit and is always positioned on the front face of the display unit to form a portion of the front face of the display unit. The variable portion 151c includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion 151c may be the front face and another portion of the variable portion 151c may be the rear face based on the first and second states. The variable portion 151c is positioned in the first direction with respect to the fixed portion 151a, 151b relative to the mobile terminal, and an end of the variable portion 151c is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(a), and may be exposed rearward in the second state as shown in FIG. 3(b).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna may be installed on the rear portion 1015. The rear portion 1015 may be used to protect the camera, the sensor, or the like on the exposed rear portion 1015 and not to deteriorate the exterior design. A portion of the rear portion 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

FIG. 6 is a side view of the mobile terminal as viewed from a third direction. FIG. 6 shows the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151a disposed on the front of the mobile terminal 100, a second region 151b coupled to a slide frame 103 positioned on the rear of the mobile terminal 100, and a third region 151c located between the first region 151a and the second region 151b and bent around the roller 210. The third region 151c may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 151a may always be exposed to the front face of the mobile terminal 100.

The third region 151c may be adjacent to the first region 151a in a direction of a second end 151e. The third region 151c may extend into the second frame 102 and be rolled on the roller 210. The third region 151c may extend out of the second frame 102 and partially cover the second frame 102, that is, the rear front of the second rear portion 1022. Since the second frame 102, i.e., the second rear portion 1022 is adjacent to the first frame 101, i.e., the first rear portion 1012, and the first and second frames 101 and 102 form the rear case of the mobile terminal 100, it may be said that the third region 151c is also disposed on the rear front of the first frame 101.

The second region 151b may be adjacent to the third region 151c and may be disposed on the rear face of the mobile terminal 100, more specifically, on the second frame 102, that is, the rear face of the second rear portion 1022 thereof. The second region 151b may be coupled to the slide frame 103 without being directly coupled to the second frame 102.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

FIG. 7 is a view showing a driving unit 200 of the mobile terminal 100 in accordance with an embodiment. FIG. 7(a) shows the first state and FIG. 7(b) shows the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness. If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state.

However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

FIG. 8 is a cross-sectional view taken along lines A-A and B-B in FIG. 2. As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling hinge 104 may be used as a support structure to fill the gap between the second front portion 1021 and the third region 151c of the flexible display unit 151.

The rolling hinge 104 may be positioned on the rear surface of the flexible display unit 151, and have a thickness corresponding to the gap between the second front portion 1021 and the flexible display unit 151 in the second state. As shown in FIG. 8(a), in the first state, the rolling hinge 104 is rolled around the roller 210 and is positioned on the lateral side and rear side of the mobile terminal 100. The flexible display unit 151 and the rolling hinge 104 may be positioned between the second rear portion of the second frame 102 and a rear cover 1025 provided to cover the rear face of the display unit 151. As shown in FIG. 8(b), when switch to the second state occurs, the rolling hinge 104 may move to the front and the rolling hinge 104 may be positioned on the front portion of the second frame 102.

The third region 151c of the display unit 151 in which the rolling hinge 104 is positioned is a portion where bending deformation occurs when switch from the first state to the second state occurs. Accordingly, the rolling hinge 104 may be deformed according to deformation of the third region 151c. Here, the rolling hinge 104 is required to have a predetermined stiffness to maintain the flat state when the flexible display unit 151 is positioned on the front or rear of the mobile terminal. That is, the rolling hinge 104 needs a structure capable of maintaining the flat state in the third direction and performing bending deformation in the first direction.

Figure 9:
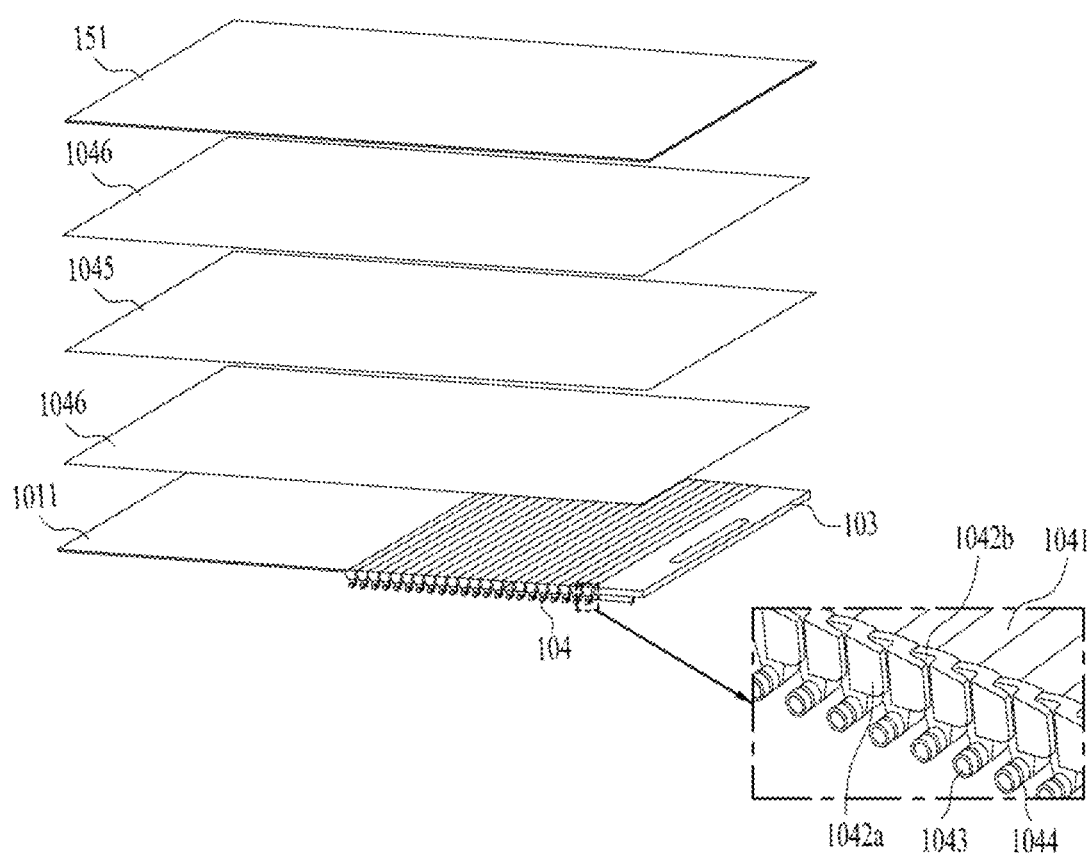
FIG. 9 is a view illustrating a display unit and a rolling hinge of the mobile terminal in accordance with an embodiment.

FIG. 9 is a view illustrating a display unit 151 and a rolling hinge 104 of the mobile terminal 100 in accordance with an embodiment. The rolling hinge 104 may include multiple support bars 1041 extending in the third direction. The multiple support bars 1041 may be arranged side by side in the first direction and spaced apart from each other by a predetermined distance. Accordingly, even when the flexible display unit 151 is rolled around the roller 210 and is thus bent, interference between the support bars 1041 may be avoided. The support bars 1041 may be implemented with an injection molding material having a predetermined thickness for stiffness, and may include materials such as SUS or ferrosilicon (FeSi).

The multiple support bars 1041 may be directly attached to the rear surface of the display unit 151. However, this operation may take a long time and produce a lot of defects, resulting in poor productivity. In addition, directly processing the display unit 151 is highly likely to damage the display unit 151. Therefore, a rolling sheet 1045 to fix the multiple support bars 1041 may be further provided. The rolling sheet 1045 may include a metal material, and may employ a superelastic material that is bending-deformable and capable of recovering the flat state after the bending deformation. For example, a superelastic metal sheet such as a thin STS sheet of 0.05 mm or less may be used. An adhesive tape may be attached to both surfaces of the rolling sheet 1045 to bond the rolling sheet 1045 to the support bars 1041 and bond the rear surface of the display unit 151 to the rolling sheet 1045.

The rolling sheet 1045 may be provided with a kerf pattern in which multiple grooves extending in the third direction are formed in the first direction. The grooves in the kerf pattern may be formed between the multiple support bars 1041. The grooves may be formed on a surface of the rolling sheet 1045 to which the support bars 1041 are bonded. The kerf pattern may be formed in a wedge shape that is formed by being gradually narrowed from the surface portion of the rolling sheet 1045.

Instead of the rolling sheet 1045, an elastic material such as silicone may be disposed between the support bars 1041 to join neighboring support bars 1041. In this case, the angle between the support bars 1041 may be varied. The elastic connector may be bent at a position corresponding to the roller 210. When positioned on the front or rear of the mobile terminal, the elastic connector may be unfolded such that the support bars 1041 are disposed forming a flat surface.

The support bars 1041 may form a flat surface corresponding to the rear surface of the display unit 151. Alternatively, as shown in FIG. 8(*b*), the support bars 1041 may be formed in a shape having a predetermined curvature. The curved support bars 1041 may closely contact the curved surface of the roller 210 when the rolling hinge 104 is rolled around the roller 210. Alternatively, one surface of the support bars 1041 in contact with the display unit 151 maintains a flat state, and the other surface thereof on the opposite side may include a curved surface corresponding to the curvature of the roller 210. In this case, the support bars 1041 may be thick at the ends thereof facing in the first and second directions and have the thinnest portion in the middle thereof.

The rolling hinge 104 may be disposed at a position corresponding to the third region 151*c* and is rolled and bent around the roller 210. Thus, the rolling hinge 104 may span over the front and rear surfaces. The rolling hinge 104 is connected to the first front portion 1011 of the first frame 101 on the front side and connected to the slide frame 103 on the rear side. In order for the flexible display unit 151 to form a continuous surface without a step, the first front portion 1011 of the first frame 101 positioned on the rear surface of the first region 151*a*, the slide frame 103 positioned on the rear surface of the second region 151*b*, and the rolling hinge 104 positioned on the rear surface of the third region 151*c* may be arranged such that the surfaces thereof in contact with the display unit 151 are at the same height. In particular, since the slide frame 103 moves on the rear of the mobile terminal 100 and moves in the same space as the rolling hinge 104, the rolling hinge 104 may have a thickness corresponding to the thickness of the slide frame 103.

Figure 10:
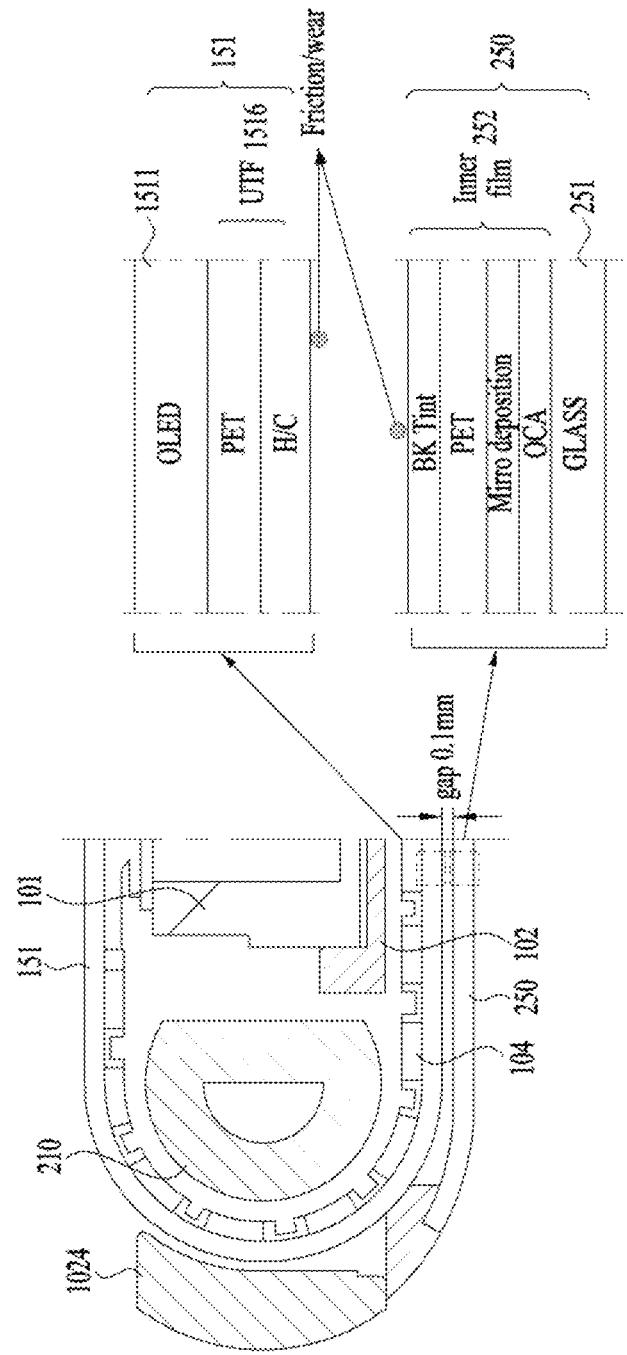
FIG. 10 is a view showing a layered structure of a display unit and a cover glass of the mobile terminal.

FIG. 10 is a view showing a layered structure of the display unit 151 and the cover glass 250 of the mobile terminal 100. The mobile terminal may include a rear cover 1025 that covers the display unit 151 positioned at the rear of the second frame 102. The rear cover 1025 may have a size greater than that of the display 151 positioned on the rear surface of the second frame 102 at the first state. The rear cover 1025 may fully cover the second frame 102, and an end portion in a second direction may have a curved surface to correspond to a shape of the mobile terminal as shown in FIG. 10.

The rear cover 1025 may prevent an end of the display unit 151 moving on the rear surface of the mobile terminal 100 from being damaged by being exposed to the outside, and may restrict the distance between the display unit 151 and the second frame 102 to minimize a gap of the display unit 151 on the rear surface of the second frame 102.

Also, if the display unit 151 positioned on the rear surface moves in the first direction to switch the first state to the second state, the rear surface of the second frame 102 covered by the display unit 151 in the first state is exposed to the outside. The rear cover 1025 may visually block the rear surface of the second frame and cover the end of the display unit so as not to be exposed to the outside, whereby the problem that the display unit is detached from the slide frame may be minimized by the rear cover 1025.

An opaque material may be used as the rear cover 1025, or a transparent material may be used as the rear cover 1025 to allow a user to view information or image output from the display unit positioned on the rear surface. A material having high reflectivity may be coated on the rear cover such that the image output from the display unit 151 is seen but an inner structure of the second frame is not seen. If the rear cover 1025 is provided with a mirror layer including a material of high reflectivity, the user may view the image when a light source exists inside, that is, only if the rear portion of the display unit 151 is activated.

The rear cover 1025 may be spaced apart from the display unit 151 to have a predetermined gap without being coupled to the display unit such that the display unit 151 may move between the rear cover 1025 and the second rear portion of the second frame. Since a problem occurs in that a thickness of the mobile terminal 100 is increased if the gap is great, the rear cover 1025 may be disposed to be close to the display unit 151 if possible (for example, 0.1 mm).

In the flexible display unit 151, an ultrathin film 1516 (UTF) is adhered to the display panel 1511 outputting an image and the front surface of the display panel 1511 as shown in FIG. 10. The ultrathin film may be made by hard coating on a transparent film such as PET film such that it may be deformed together with bending deformation of the flexible display panel 1511.

The rear cover 1025 may include a glass layer 251 and an inner film 252, and in consideration of an external scratch, the glass layer 251 may be exposed to the outside and the inner film 252 may be disposed to face the display unit. The inner film may implement a tint and a reflective effect of the rear cover 1025 by depositing a tint layer or mirror layer on a transparent film 2521 such as PET.

Since the display unit 151 includes a flexible material, bending deformation may finely occur and the inner film 252 of the rear cover 1025 may partially be in contact with the display unit 151. The display unit 151 also includes a flexible film material, and the inner film 252 is deposited on the inner side of the rear cover 1025, whereby a van der Waals force occurs between these two films.

The van der Waals force is attraction generated when a distance between molecules or atoms becomes short, and varies depending on the distance and a material. If the van der Waals force is increased, a static frictional coefficient is rapidly increased. That is, the display unit 151 and the rear cover 1025 may be adhered to each other by the van der Waals force to disturb a slide motion of the display unit 151.

If the display unit 151 moves in the first direction or the second direction by means of a force more than the van der Waals force, the display unit 151 or the rear cover 1025 may be worn or damaged. In the present disclosure, in order to solve this problem, the van der Waals force between the display unit 151 and the rear cover 1025 is reduced to lower the frictional coefficient between the two members.

A cover material having a small frictional coefficient is not limited to the rear surface of the mobile terminal 100, and may be provided on the front surface or side in a position where the display unit 151 slidably moves. Therefore, the cover material includes the rear cover 1025 and will be referred to as a cover glass 250 so as not to be limited to the position.

The cover glass 250 includes a glass layer 251 and an inner film 252 adhered to the glass layer 251. The inner film 252 may provide a tint of the cover glass 250 and form a mirror layer 2522 by depositing a high reflective material to allow the inside not to be seen by a user in a state that an image is not output from the display unit 151.

The flexible transparent film 2521 such as PET may be used as the inner film 252, and the inner film 252 may include a mirror layer 2522 for reflection and a tint layer 2523 for tint.

The mirror layer 2522 covers the inside of the mobile terminal 100 to allow the inside of the mobile terminal 100 not to be seen from the outside by reflecting light. The rear surface of the second frame 102 is exposed at the second state but is not seen well by the user due to the mirror layer 2522, whereby a neat appearance may be provided. If an image is output from the display unit 151, the corresponding light may pass through the inner film 252, whereby the user may see the image output from the display unit 151.

The cover glass 250 forming the appearance of the mobile terminal 100 may be implemented in various tints through the tint layer 2523. The tint layer 2523 may be implemented by coating a tint and control transparency of the cover glass 250 by controlling a concentration.

The mirror layer 2522 and the tint layer 2523 may be deposited on both surfaces of the transparent film 2521, and the inner film 252, which includes the mirror layer and the tint layer, may be adhered to the glass layer by a transparent adhesive (OCA).

The cover glass 250 may form a black matrix 255 (see FIGS. 14 and 15) on the inner film 252 along an outer circumference. The black matrix 255 may serve as a guide for cutting a material of the inner film 252 of a large size during a manufacturing process of the cover glass 250, which will be described later. Since the black matrix 255 has an adhesive ingredient, it may be used for adhesion to another component. That is, when the cover glass 250 is fixed to the frame, the adhesive ingredient of the black matrix 255 may be used.

FIG. 11 is a view showing an embodiment of a layered structure of a cover glass 250 of the related art. Although a relatively thin display unit 151 is shown, it is to be understood that the relatively thin display unit is for expression on the drawing.

FIG. 11(a) is a view showing that the tint layer 2523 and the display unit directly face each other. When the display unit 151 slidably moves, even though a predetermined gap is formed and disposed to provide a moving space of the display unit 151, a van der Waals force may be generated between the surface of the display unit 151 and the surface of the inner film 252, whereby movement of the display unit 151 may be restricted.

Anti-fingerprint coating may be subjected to the tint layer 2523 as shown in FIG. 11(b) to reduce adhesion of the tint layer 2523 due to the van der Waals force. The anti-fingerprint coating is a coating method for preventing impurities such as fingerprint from remaining on the surface of the mobile terminal by applying the anti-fingerprint coating to the front surface of the mobile terminal. For the anti-fingerprint coating, water-repellent coating may be used to prevent fingerprint from remaining on the surface by preventing water drop or contaminant from being adhered to the surface, or coating based on fluorocarbon solvent may be used. The anti-fingerprint coating is generally intended to reduce contamination of the surface. If the anti-fingerprint coating is performed on the tint layer 2523, a surface adhesion of the tint layer 2523 may be reduced, whereby a frictional coefficient of the cover glass 250 may be lowered.

In FIG. 11(b), the van der Waals force is less than that in FIG. 11(a) but the display unit 151 is still adhered to the surface of the cover glass 250.

A pattern imprinting layer may additionally be provided as shown in FIG. 11(c). The pattern imprinting layer is a coating layer having a pattern and has an embossed surface. Although the adhesion of the display unit 151 onto the surface of the cover glass may be reduced, problems occur in that the thickness of the inner film 252 is increased and a haze occurs due to the embossed surface.

As shown in FIG. 11(d), a silicon additive may be added to the tint layer 2523 when the tint slayer 2523 is formed. Even though the silicon additive is added to the tint layer 2523, the display unit 151 may be still adhered to the cover glass. Also, since wetting does not occur when the black matrix 255 is subjected to printing, a problem occurs in that it is difficult to form the black matrix 255.

As described with reference to FIG. 11, the method of the related art still has a problem that the display unit is adhered to the cover glass due to a strong van der Waals force. In order to reduce the van der Waals force, fine beads may be mixed with the tint layer 2523 and coated to form a fine protrusion on the surface of the inner film 252.

FIG. 12 is a table showing frictional coefficients and a haze effect based on type, size and content of fine beads 2525 added to the tint layer 2523. The haze effect means that light is seen to be blurred by being scattered by the fine beads. If the fine beads 2525 are added to the tint layer 2523, the haze effect may vary depending on size and content of the fine beads. Particularly, scattering is remarkably generated by the fine beads protruded on the surface of the tint layer 2523. Acryl beads or silica may be used as the fine beads, and their sizes vary to perform a test.

The frictional coefficient means a slip level between the display unit 151 and the cover glass 250, and means a resistance level during a slide motion. The greater the frictional coefficient is, the greater the van der Waals force is. In this case, the slide motion is not performed well.

The tint layer 2523 has a low haze effect of 0.5% but has no slip, whereby the display unit 151 is adhered to the tint layer 2523 so as not to measure a frictional coefficient. Also, when friction is repeated by a force of 500 g, a problem occurs in that wear occurs in 500 times.

Acryl beads having a diameter of 10 μm are added to the tint layer 2523, and are subjected to a test by being divided into a content of 5%, a content of 10% and a content of 15%. The more the content is, the greater the haze effect is. The frictional coefficient is 0.24 to 0.23 and similarly occurs regardless of the content.

A relatively great haze effect occurs, and a great frictional coefficient still occurs, whereby a type of the fine beads 2525 is changed to silica and then subjected to a test. Silica may be implemented at a size smaller than the acryl beads, and silica of 3 μm corresponding to ⅓ of the acryl beads and silica of a smaller size (100-150 nm) in a nanometer unit are added for a test.

In case of silica having great beads, the frictional coefficient of silica is lower than that of the acryl beads but the haze effect still occurs, whereby a problem occurs in that visibility of an image output from the display unit 151 is deteriorated. In case of silica beads in a smaller nanometer unit, the haze effect may be lowered to 4.3 to 4.5. If a content of silica is 5%, the frictional coefficient of silica is similar to that of acryl of 3 μm but if the content of the silica is increased to 20%, the frictional coefficient of silica is smaller than that of acryl. Although there is a difference depending on a content of silica beads, it is favorable to adopt silica having a content of 20% in view of the frictional coefficient.

FIG. 13 is a table showing frictional coefficients and wear performance based on anti-fingerprint coating and fine beads. In more detail, FIG. 13 is a table showing frictional coefficients and wear performance of a cover glass 250 (case 1) formed by coating an anti-fingerprint coating layer 253 on the tint layer 2523 as shown in FIG. 11(b), a cover glass 250 (case 2) comprising a tint layer 2523 mixed with silica beads of a nanometer unit in FIG. 12, and a cover glass 250 (case 3) formed by the anti-fingerprint coating on the tint layer 2523 of the case 2.

The wear performance means the number of occurrence times of scratch generated on the surface when an ultrathin film constituting the surface of the display is rubbed with a predetermined force above the inner film of the cover glass 250. In this test, wear performance of the inner film 252 is observed when the ultrathin film is rubbed with a force of 500 g.

In the case 1, since the van der Waals force is still strong as described above, the ultrathin film and the tint layer 2523 of the inner film 252 are adhered to each other, whereby the frictional coefficient cannot be measured. Therefore, wear performance cannot be measured.

In the case 2, since the silica beads are protruded on the surface of the tint layer 2523, adhesion based on the van der Waals force becomes weak, whereby the silica beads may slide from the surface at a frictional coefficient level of 0.17 to 0.18. The wear performance generates a scratch on the inner film 252 in ten thousand times when the ultrathin film is rubbed with a force of 500 g above the tint layer 2523. The scratch may be generates due to a problem that the silica beads of the tint layer 2523 are separated from the tint layer or broken by friction of the ultrathin film.

In order to prevent the silica beads from being separated from the tint layer 2523 or prevent the silica beads from being broken, anti-fingerprint coating may be performed on the tint layer 2523 and the silica beads like the case 3. The anti-fingerprint coating may allow the silica beads to be adhered to the tint layer 2523 in a single body such that the silica beads may not be separated from the tint layer 2523. Since the silica beads are thin, embossed patterns caused by the silica beads are generated on the surface, whereby an improvement effect of slip may be maintained.

The frictional coefficient of the case 3 is similar to that of the case 2 but a scratch is not generated on the surface even though the ultrathin film is rubbed in forty thousand times, whereby durability of the cover glass 250 may be improved without disturbing driving of the display unit 151.

As shown in the table of FIG. 12, if the content of the fine beads is increased, the amount of light scattering is increased and haze is seriously generated. If the size of the fine beads becomes smaller, even though the content of the fine beads is increased, haze is not seriously increased. However, if the fine beads are smaller, wear performance is deteriorated.

If silica of 3 μm is used, when the ultrathin film is rubbed with a pressure of 500 g, wear performance is not deteriorated even in case of friction in forty thousand times. However, in case of fine silica beads of 100 to 150 μm, a problem occurs in that wear performance is deteriorated by friction in ten thousand times.

Although the amount of fine beads included in the tint layer affects haze, a scattering level is serious if the fine beads are greatly protruded to the outside, whereby a great haze value is caused.

Instead of reducing the content of the fine beads to lower the frictional coefficient and fulfil wear resistance performance while reducing haze, a pattern layer including micro-dots may be deposited on the surface of the inner film.

FIG. 14 is a view showing an inner film deposited with a pattern layer on which micro-dots are formed and patterns of micro-dots. As shown in FIG. 14(a), the pattern layer is provided with micro-dots of a semi-spherical shape disposed on a transparent film layer at a predetermined interval.

The micro-dots are protruded from the surface in a semi-spherical shape, and the pattern layer may be formed using a mold provided with a groove corresponding to the pattern of the micro-dots. After UV hardening material is coated and then the pattern is formed by the mold, the pattern layer may be hardened by UV hardening.

The micro-dots may be spaced apart from one another at the same interval and disposed to form an array in a square shape. The micro-dots may be disposed in parallel with each side of a cover glass of a square shape as shown in FIG. 14(b), or a rectangular pattern may be disposed to be inclined at 45° as shown in FIG. 14(c). Moire such as a wave pattern may be generated in accordance with a pattern angle and an interval between the micro-dots.

FIG. 15 is a table showing performance based on a pattern interval and direction of micro-dots. The content of the fine beads is 1% or less when the pattern layer is deposited, whereby haze is not generated.

The micro-dots may be configured to be protruded at a height of 5 to 7 μm in consideration of an interval between the display unit and the cover glass. If a diameter of the micro-dots is too great, a visible problem occurs in view of a visual aspect. If the diameter of the micro-dots is too small, the micro-dots are easily worn, whereby wear resistance is deteriorated. Therefore, the micro-dots may be formed at a size of 25 μm to 50 μm.

T7 to T10 show performance of the pattern layer including micro-dots of a grid pattern, which are disposed on each side of the mobile terminal in parallel, and T11 to T14 show performance of the pattern layer including micro-dots disposed to be inclined at 45° in a rhombus shape.

In each test group, the diameter of the micro-dots is 50 μm, and an interval between the respective micro-dots varies.

Figure 16:
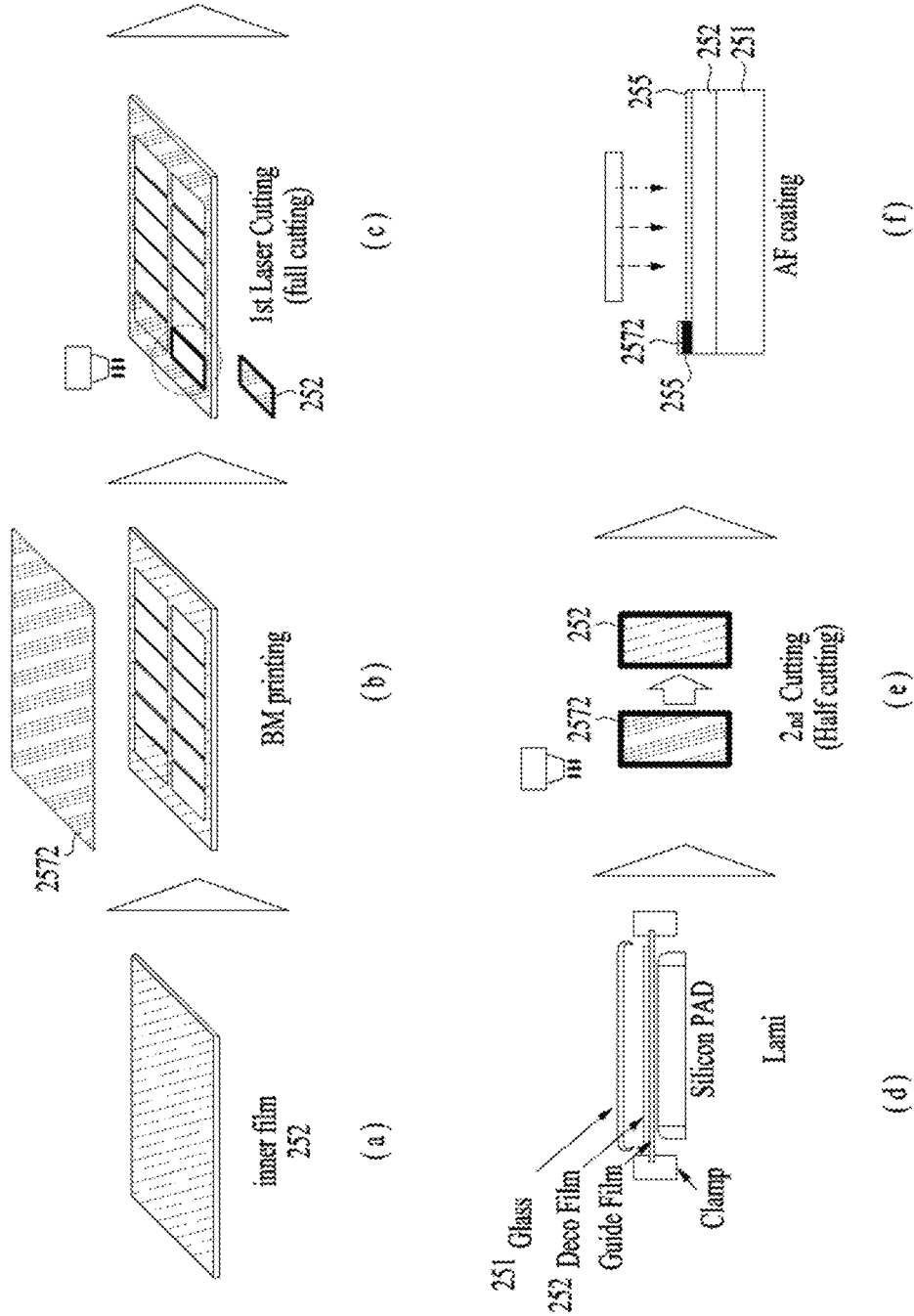
FIG. 16 is a flow chart showing a method for manufacturing a cover glass of the present disclosure.

FIG. 16 is a flow chart showing a method for manufacturing a cover glass 250 of the present disclosure, and FIG. 17 is a conceptual view showing a layered structure of the cover glass 250. In FIG. 16(a), the tint layer 2523 including the fine beads 2525 is deposited on the transparent film 2521, whereby a material of the inner film 252 is manufactured. The fine beads 2525 may include silica 100~150 nm as described above.

A high reflective material may be deposited on the other surface of the transparent film 2521 to form the mirror layer 2522. Since the material of the inner film 252 has a big size, the black matrix 255 which will guide a position for cutting the material may be printed to cut the material at an actually required size. As shown in (b), the black matrix 255 may be formed in a rectangular shape corresponding to the size of the cover glass 250.

A laser cutting may be performed along the black matrix 255 as shown in (c), whereby the inner film 252 may be formed at a unit film size as shown in (d). The glass layer 251 may have a curved surface in accordance with a shape of the mobile terminal 100, and the inner film 252 is adhered to the glass layer 252 by using a jig corresponding to the curved surface of the glass. A transparent adhesive may be formed on the other surface of the inner film 252 to adhere the inner film 252 to the glass.

As shown in FIG. 17, a releasing agent 2571 may be adhered to a material when the material is manufactured, such that a transparent adhesive positioned on the other surface (lower side on the drawing) of the inner film 252 is not contaminated, and the releasing agent 2571 may be removed and the inner film 252 may be adhered to the glass layer 251 as shown in (e).

The black matrix 255 formed on one surface of the inner film 252 has an adhesive ingredient, and its adhesion may be used when the cover glass 250 is adhered to the second frame 102. A releasing agent 2572 may be provided on one surface of the inner film 252 such that the adhesive ingredient of the black matrix 255 is not contaminated. When the inner film 252 is adhered to the glass layer 251, the releasing agent in one surface direction protects the surface of the inner film 252, whereby the inner film 252 is not damaged during a coupling process.

Anti-fingerprint coating may be performed for one surface of the inner film 252 adhered to the glass layer 251 to form the anti-fingerprint coating layer 253. At this time, if the releasing agent is fully removed, the black matrix 255 may be contaminated, and if anti-fingerprint coating is performed for the black matrix 255, adhesion is lost. Therefore, in order to remove the releasing agent except the portion where the black matrix 255 is positioned as shown in (f) before anti-fingerprint coating is performed, the releasing agent 2572 is only cut by controlling intensity of laser (half cutting of FIG. 17).

The releasing agent is removed and the anti-fingerprint coating layer 253 is formed through anti-fingerprint coating on the exposed surface of the tint layer 2523, whereby wear resistance may be improved.

As described above, the cover glass of the present disclosure has good slip and excellent wear resistance. Since the mobile terminal of the present disclosure is not adhered to the display unit or the cover glass, the slide motion of the mobile terminal is not disturbed, whereby the mobile terminal of the present disclosure has excellent operation performance.

Also, since the cover glass has good wear resistance, the mobile terminal is not damaged by movement of the display unit, whereby durability may be improved.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a body having a variable size;
a display including a variable portion slidably moveable in accordance with a change in size of the body; and
a cover glass coupled to the body such that the cover glass covers at least a portion of the variable portion of the display, and having a first surface contacting with the variable portion,
wherein the cover glass includes:
a glass layer having the first surface facing the display; and
an inner film located on the first surface of the glass layer, wherein the inner film includes:
a tint layer including fine beads; and
a water-repellent coating layer on a first surface of the tint layer facing the display, wherein the water-repellent coating layer is configured to reduce a surface adhesion of the tint layer such that a frictional coefficient between the cover glass and the variable portion of the display is lowered.

2. The mobile terminal of claim 1, wherein the fine beads include silica having a content of 20% of the tint layer, and wherein each of the fine beads has a diameter of 100 nm to 150 nm.

3. The mobile terminal of claim 1, wherein each of the fine beads has a diameter of 100 nm to 150 nm.

4. The mobile terminal of claim 1, wherein the fine beads have a content of 5% or more of the tint layer.

5. The mobile terminal of claim 1, further comprising a primer layer between the water-repellent coating layer and the tint layer.

6. The mobile terminal of claim 1, further comprising a black matrix at an outer circumference of the tint layer, wherein the water-repellent coating layer is at an area of the tint layer other than an area where the black matrix is located.

7. The mobile terminal of claim 1, further comprising a mirror layer on a surface of the transparent film layer.

8. The mobile terminal of claim 1, wherein the inner film is adhered to the glass layer by a transparent adhesive.

9. The mobile terminal of claim 1, further comprising a pattern layer on the first surface of the tint layer, the pattern layer including micro-dots disposed in an array pattern to be spaced apart from one another at a predetermined interval.

10. The mobile terminal of claim 9, wherein the cover glass has a rectangular shape having four sides, and the micro-dots are disposed in a square pattern having sides that are parallel with corresponding sides of the cover glass or inclined at an angle of 45° with respect to corresponding sides of the cover glass.

11. The mobile terminal of claim 10, wherein an interval between adjacent micro-dots of the micro-dots ranges from 800 μm to 1000 μm.

12. The mobile terminal of claim 9, wherein each of the micro-dots has a diameter of 25 μm or more.

13. The mobile terminal of claim 9, wherein the fine beads have a content of 1% or less of the tint layer.

* * * * *